F. G. SARGENT.
STOCK CARRIER.
APPLICATION FILED JAN. 17, 1916.

1,203,135.

Patented Oct. 31, 1916.

Witness
C. F. Nisson

Inventor
F. G. Sargent
By attorneys
Southgate & Southgate.

UNITED STATES PATENT OFFICE.

FREDERICK G. SARGENT, OF WESTFORD, MASSACHUSETTS, ASSIGNOR TO C. G. SARGENT'S SONS CORPORATION, OF GRANITEVILLE, MASSACHUSETTS, A CORPORATION OF MASSACHUSETTS.

STOCK-CARRIER.

1,203,135.      Specification of Letters Patent.      Patented Oct. 31, 1916.

Application filed January 17, 1916. Serial No. 72,486.

*To all whom it may concern:*

Be it known that I, FREDERICK G. SARGENT, a citizen of the United States, residing at Westford, in the county of Middlesex and State of Massachusetts, have invented a new and useful Stock-Carrier, of which the following is a specification.

This invention relates to a device for carrying stock along a course for any desired purpose, but chiefly for use in drying machines and it is particularly adapted for carrying fibrous stock such as wool and the like and keeping it spread out in a comparatively thin layer while it is being carried through the drying or other machine.

The principal objects thereof are to provide a simple and inexpensive means whereby stock will be conveyed along a table or the like, and especially to provide in combination with a reciprocating table means for positively preventing the stock from being carried in one direction and allowing it to be carried in the other.

The invention also involves improvements in details of construction and combinations of parts as will hereinafter appear.

Reference is to be had to the accompanying drawings, in which—

Figure 1:
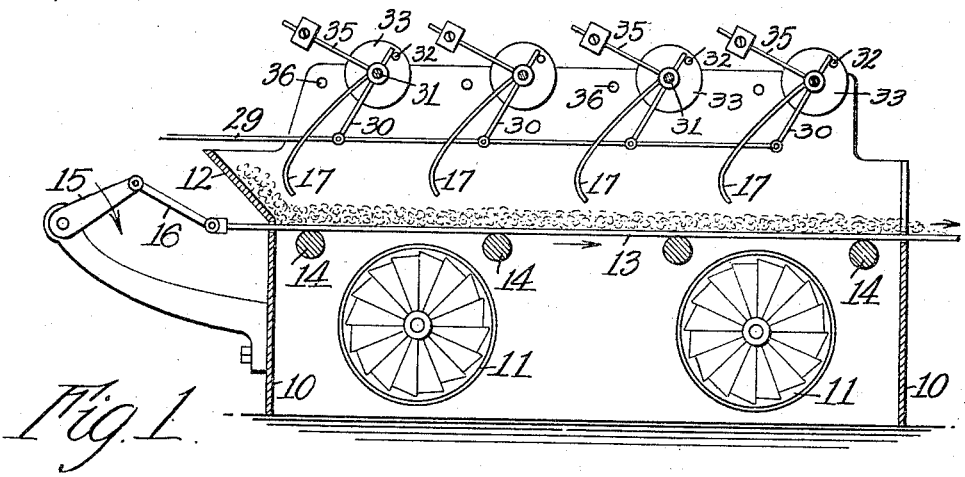
Figure 2:
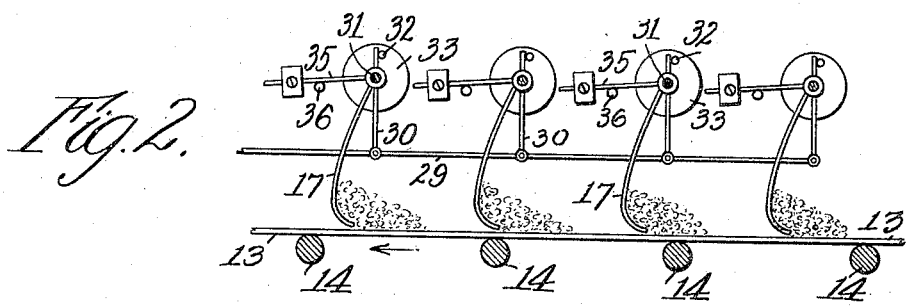
Figure 3:
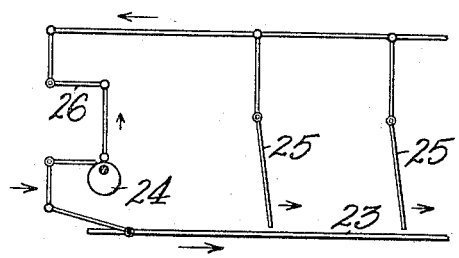

Figure 1 is a longitudinal central sectional view of a wool drier showing one form of this invention applied thereto; Fig. 2 is a similar view showing the parts in another position; and Fig. 3 is a side view of another form of carrier.

Although the invention is capable of application to other machines than driers, it is shown in Figs. 1 and 2 as applied to a drier 10 in which fans 11 are used for circulating the air. The wool or other material is fed down a chute 12 on a table 13 resting on rolls or wheels 14. This table is of screen cloth, perforated metal or the like to permit the air to pass through and is given a reciprocating motion by means of a crank 15 and pitman 16. Located above this table are a series of swinging members 17. These members are in the form of plates or rake fingers as may be desired. The swinging rake members are operated by a reciprocating rod or link 29. This has connected with it a plurality of levers 30 each one freely swinging on a transverse rake shaft 31.

Each of these rake shafts is provided with a disk 33 fixed to it, and having a pin 32 located in the path of the projecting end of the corresponding lever 30 so that in some positions of this lever its end will engage the pin 32 and turn the disk and therefore the shaft. On each of these shafts is also fixed a weighted arm 35 constituting a counterweight. The movement of the counterweight downwardly is limited by a fixed stop 36 in each case.

The operation will be obvious from an inspection of Figs. 1 and 2. When the supporting table or carrier moves forward, the upper end of each lever 30 engages its pin 32, turns the disk, shaft and lever, the members 17 are raised out of the stock and the stock passes under them, but when it starts to move back each lever 30 is brought out of contact with its pin 32 and allows the counterweight lever 35 to come down against the stop 36 if the stock on the carrier will allow it to. This brings the rakes down into the stock against the stops and no more stock can pass under them in that direction so it is held where it is ready to go forward on the next forward motion of the carrier.

In the form shown in Fig. 3 the carrier 23 is operated through a link motion by cam 24 and the pivoted members 25 are positively operated from said cam by another link motion as 26. The parts are timed so that when the carrier 23 moves forward the members 25 will also move up forwardly and when it moves back they will move down to substantially vertical position so as to hold the stock from going back with the carrier.

It will be observed that in case of any obstruction the rakes will yield instead of breaking or stopping the machine.

Although I have called the parts 17 and 25, pivoted members and rakes, it is to be understood that they can all have rake teeth, or can be made solid, perforated or otherwise.

Although I have illustrated and described only two forms of the invention I am aware of the fact that many modifications can be made therein by any person skilled in the art without departing from the scope of the invention as expressed in the claims.

Therefore I do not wish to be limited to all the details of construction or to the forms specifically shown herein, but What I do claim is:—

1. In a carrier for fibrous stock or the like, the combination with a reciprocating table for supporting the stock, of a series of swinging members and mechanism for positively swinging said members out of the stock to permit the stock to move forward with the table and swinging them into the stock to prevent it from moving back.

2. In a carrier for fibrous stock or the like, the combination with a reciprocating table for supporting the stock, of a plurality of swinging members above the table and means for swinging said members up out of the stock as the table moves forward and for moving them to a position to hold the stock as the table moves back.

3. In a carrier for fibrous stock or the like, the combination with a reciprocating support for the stock, of a plurality of rake members pivoted above the support, a reciprocable actuating member for said rake members located parallel with the plane of the support, and means for reciprocating said actuating member oppositely to the support.

4. In a carrier for fibrous stock or the like, the combination with a support for the stock, of a plurality of rake members, a reciprocable actuating member for said rake members, shafts to which said rake members are fixed, and means pivoted on said shafts for swinging the rake members during part of the motion of said actuating member.

5. In a carrier for fibrous stock or the like, the combination with a support for the stock, of a plurality of rake members, a reciprocable actuating member for said rake members, parallel transverse shafts to which said rake members are fixed, levers pivoted on said shafts and connected to said actuating member and each having means for moving one of the rake members back, and counterweights for moving the rakes toward the support when released from the influence of said levers.

In testimony whereof I have hereunto set my hand.

FREDERICK G. SARGENT.

Copies of this patent may be obtained for five cents each, by addressing the "Commissioner of Patents Washington, D. C."